May 2, 1939.   C. P. VEBER   2,156,440
COMBINATION TIME LAPSE AND PHOTOELECTRIC EXPOSURE CONTROL MECHANISM
Filed Aug. 18, 1937    4 Sheets-Sheet 4
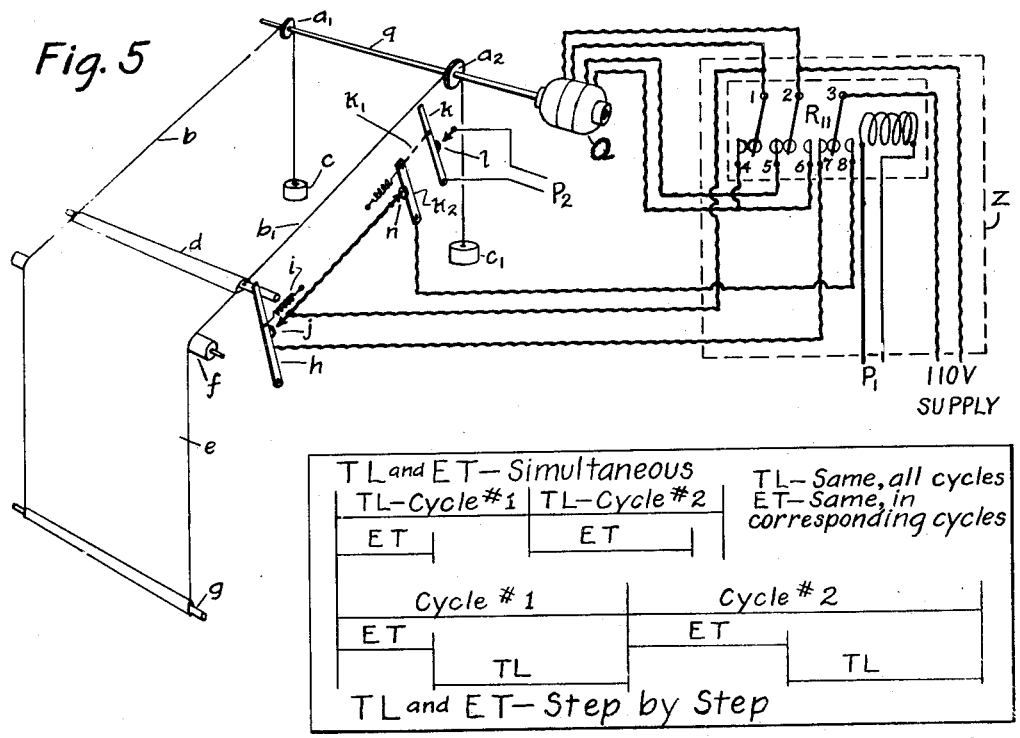
Fig. 5
Fig. 4
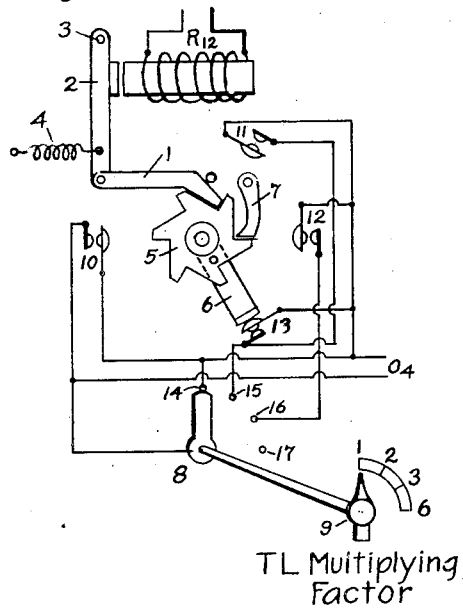
Fig. 6
TL Multiplying Factor
INVENTOR
CLINTON P. VEBER
BY
A. D. T. Libby
ATTORNEY Patented May 2, 1939

2,156,440

UNITED STATES PATENT OFFICE 2,156,440

COMBINATION TIME LAPSE AND PHOTO-ELECTRIC EXPOSURE CONTROL MECHANISM

Clinton P. Veber, Highland Park, N. J., assignor to Endowment Foundation, New Brunswick, N. J., a corporation of New Jersey Application August 18, 1937, Serial No. 159,704

48 Claims. (Cl. 95—10)

This invention relates to a combination time lapse and photo-electric exposure control mechanism, and the character and scope of the invention is expressed in the following objects to which the same is directed:

One of the objects of the invention is to provide an apparatus or mechanism that will control a camera, preferably a motion picture camera, so that one frame or picture is exposed at set intervals of time, usually much longer than in normal speed motion picture photography, and control the exposure time of each frame so it may, if desired, be inversely proportional to the average light intensity regardless of nature or amount of light on the subject, or selected portion thereof, during exposure; or in which the proportionality itself may be a function of light intensity on the subject during exposure.

Another object of this invention is, first, to provide means whereby the time lapse period, or interval of time between exposures may be infinitely varied over a wide range of time, as from ⅕ second to 1 hour, or ⅕ second to one month, if necessary; and means whereby these intervals may be set instantly at any time, so that this set interval will run concurrently, if desired, with exposure time intervals, and therefore not be affected by varying exposure periods, unless these become longer than the set time lapse period, in which case provision can be made so that the apparatus merely waits until exposure is terminated, then starts a new exposure, whereby these timing intervals—both time lapse and exposure time, hereinafter referred to respectively as TL and ET—may be only slightly affected by wide changes in temperature, which may be compensated for if necessary; and not at all affected by changes in humidity.

Another object is to provide means whereby the time lapse period may be instantly extended to infinity, if desired, in cases where the exposures are to be started manually, and not timed; and to provide means, if desirable, whereby visual or other indication may instantly be had as to how much time is necessary for the completion of that particular time lapse cycle, and the starting of another one; and whereby the exposure time of a particular cycle or series of cycles may be indicated, or recorded, or averaged, if desirable.

A further object is to provide means for holding exposure time constant at any desired value, for all exposures; and means for altering this time so that it may be infinitely varied over a wide range—say from 1/10 second to 10 minutes, for use when it is desired to take pictures by a constant light source; also means for controlling operation of a curtain mechanism for shielding the subject from external illumination during exposure, for instance when it is desired to photograph by a constant light source, with a constant exposure, and still permit maximum amount of solar radiation to reach the subject between exposures and other purposes.

Another object is to provide means for taking time lapse motion pictures by any light available, whether natural, artificial or both, regardless of change in average intensity, or shifts in spectral intensity, during or between exposures—regardless of distribution of light on subject areas, change in color or area of subject, change in temperature and/or humidity, so that, for instance, solar radiation need not be cut off from the subject at any time by a curtain system, or other heavy, bulky, cramped mechanism, but, if desired, shadows cast by the sun from a portion of the subject may be recorded, as they travel throughout the day, and the passage of clouds may be noted by the disappearance of these shadows, and to permit time lapse photography in the field and greenhouse, as well as the laboratory; and means for integrating light reflected from the subject in the direction of the camera during exposure, and regulating exposure time accordingly, so that each frame may have exactly the same average density, or any selected portion of each frame may have the same average density as all the others, or any long sequence of frames may have a successive and gradual change in density to accomplish certain useful purposes; for instance, if it were desired that transition between day and night might be accomplished by a slight and gradual darkening of the picture series, in order to add realism, or to fix in mind, without printed or verbal aid, the actual time when certain changes in subject are taking place.

A still further object is to provide a machine that may be operated on either 110 volts A. C., or 6 volts D. C., with means such as a selector switch that will determine instantly which of these supply voltages shall be used, even though they both may be plugged into the machine, and without affecting the accuracy of operation. In addition, the switch may have an "off" position which will entirely shut down the machine, leaving the condensors charged and ready to resume operation after periods of idleness up to even one month or longer as soon as the switch is again turned to the desired operating voltage, and without further manipulation; also to provide means whereby current may be consumed only during exposure, if desired, so that current draw between exposures will be zero; and to provide such a machine that will have no moving parts except contacts and controls.

A further object is to provide, in this machine, preferably a single switch of the desired number of positions, which will entirely control all functions of any necessary artificial light which may be used to illuminate the subject when other possible sources of light are low or lacking; for instance, the lights may be turned on steady, or off entirely, or may be made to go on only during exposure simultaneously with camera, or may be delayed for a short period, say 3 seconds, after the camera shutter opens. Such a light-delay period would serve the useful purpose of keeping artificial light off during daytime, since most daylight exposures are under 3 seconds, and would not affect accuracy of night exposures. Means may be provided, if necessary, so that this "light-after-camera-delay", may be automatically cut out on time lapse periods of one minute or less, regardless of position of light switch.

Still another object is to provide on this machine a warning signal that will give a short indication about ten seconds before exposure is to be made, so that anyone in the field of view of camera or variable exposure control, hereinafter referred to as VE, can get out of the way. Since this warning and delay are not usually necessary or desirable for time lapse periods under one minute, and because re-cycling of thermal delay relays, which may be used for this delay, might take up to a minute; and also, since this warning and delay may consume a fair amount of current, it probably would not be necessary or desirable when the machine is operated on 6 v. battery. Therefore, the machine may be so equipped that warning and delay is automatically cut out under these conditions.

A further object is to provide on this machine, a camera cutout which will, when manually operated, open the camera circuit and close it when released. This is provided so that action of machine may be checked in the field without disconnecting the camera, and will prevent accidently leaving the camera disconnected and thus leaving an objectionable gap in the picture series.

Another object is to provide on the machine, a maximum exposure time control, so that if anything should happen, for instance light bulbs burn out at night, the exposure would be automatically terminated after a certain time, which usually would be set to about two or three times the lengh of maximum contemplated exposure time. Its function, normally, would be to protect the machine and camera from being left on continuously for long periods and thus heat and possibly burn out the circuit elements, and to protect the battery, if battery-operated, from being run down. It may also be used for special effects. The control may be turned off completely, which normally should be done, if not used. The machine may be so equipped, if desired, that this control may be automatically cut out on time lapse periods of one minute or less, since a picture series of normal length, if taken at or less than this rate, would require but a short run, and the entire setup would probably be under more or less constant observation for the duration of the run, and also since the thermal time delay relay, which may be used to determine this maximum ET, might require up to a minute for re-cycling.

Another object is to provide, if desirable, in addition to and working in conjunction with the maximum exposure time control previously mentioned, a cutout means which will automatically cut the camera out of circuit when maximum ET control terminates exposure, and keep the camera inoperative until light gets strong enough to keep the exposure within maximum ET. It probably will be found advantageous to have, along with this cutout, a push button which, when momentarily operated, will either mechanically or electrically move a member of said cutout means, so that the camera is disconnected. If this feature is incorporated in the machine, the push-and-hold camera cutout, as before noted, would be superfluous, since a momentary push would now cut the camera out for one frame only.

A further object is to provide, if desirable, "plug-ins" which will operate a curtain control. This control, in conjunction with automatic limit switches on the curtain mechanism proper, would control the operation of the curtain system.

Still another object is to provide on the machine, if desirable, a number of different camera plug-ins, one type to be arranged to supply about 6 v. D. C. to a camera; another type arranged to supply .35 v.; and other types to provide other camera voltages, the object being to minimize the danger of plugging in a low voltage camera to a high voltage plug-in. Also, to provide, if desirable, one or more 110 v. or 6 v. light plug-ins which might be used for actuating the coil of heavy duty relays when more light is required than the machine is equipped to handle.

A further object is to provide, if desirable, a momentary push-button switch which will serve at least two purposes; that of an exposure trip and a starting trip. After long periods of disuse, say months or years, it might be necessary to push the starting switch momentarily in order to recharge the condensers, or if the button is held down, a series of exposures could be made as rapidly as light conditions permit, with a sort of machine-gun action. Plug-ins for an extension trip can also be provided when exposures are to be controlled at a distance from the machine, or when the TL periods are to be timed, by means other than the time-lapse system herein described; for instance, a synchronous motor, equipped with timing contacts.

A further object is to provide, if desirable, a lens of a suitable type for use as a light collector for a photo-cell, equipped, if desirable, with a variable iris diaphragm or a number of fixed diaphragms each successively larger, preferably, to double the exposure time. The optical system might also be arranged so that the subject image may be focused on a ground glass, and further arranged so that the exposed area of the ground glass can be changed, either by another variable iris diaphragm or a series of fixed masks each successively larger, preferably, to double the area, the opening itself, preferably, to take the shape of a rectangle similar in proportion to a single motion picture frame. The reasons for masking the ground glass might be so that the machine can be used alongside a camera equipped with lenses of different focal lengths, in order that the same section of the subject may be included on the ground glass as is included on the film in the camera; or, if desirable, a larger or smaller section, as the case may demand. If desirable, the light from the ground glass would actuate the photo-cell, thus largely compensating for areas of different sensitivity on its light-sensitive element. A sunshade may be provided to prevent variations in exposure due to extraneous light.

In general, the object of this invention is to provide an apparatus which will accomplish some or all of the objects stated above, as well as others discernible to one skilled in this art; which will be reliable, relatively cheap and compact; an apparatus that is economical of current and independent of external conditions, such as temperature, humidity, light intensity or spectral variation, supply voltage fluctuations and long-time runs; that will permit the taking of time-lapse pictures in the field and greenhouse, as well as laboratory; that will be automatic as much as possible without sacrificing efficiency, utility or versatility, and will be sufficient in itself to control cameras, lights and other associated equipment for time-lapse photography; that will be simple, for those unskilled in the art, to set up, operate and secure pictures worthy of the best efforts of the art.

The preceding objects are attained by the apparatus to be herein described, taken in connection with the annexed drawings, wherein:

Figures 1 and 2, taken together, include a wiring diagram showing electrical, mechanical, photographic, optical and other elements incorporated in one form of my invention. This diagram has been divided into two parts to get it on the sheets with sufficient clearness. Adjacent and like numbered lines at the bottom of Figure 1 and top of Figure 2 are to be considered as connected.

Figure 4 is a timing diagram illustrating the difference in the sequences of TL and ET when run simultaneously or step by step.

Figure 5 is a diagram schematically illustrating one form of curtain control which may be used under some conditions of operation of my system.

Figure 6 is a diagram of a ratchet relay for getting multiples of time-lapse periods.

Figure 1:
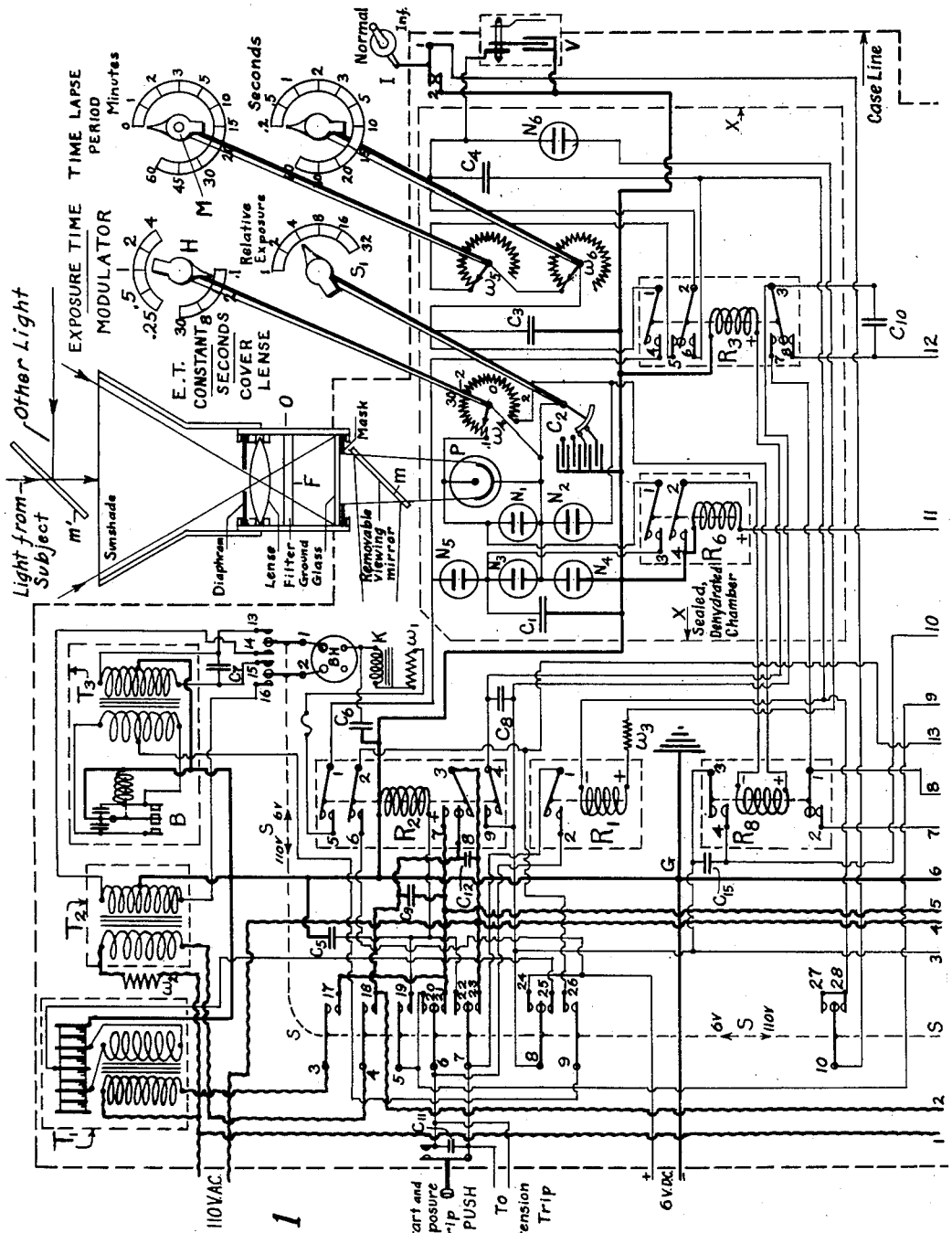

As to the various pieces of apparatus entering into the mechanism, it may be briefly stated that in Figure 1, $T_1$ is a combination transformer and rectifier for changing a primary source of current, such as 110 v. A. C., to 6 v. D. C. $T_2$ is a transformer for transforming a common source of 110 v., A. C., to a suitable voltage, for example, 300, for use on the timing devices. $T_3$ comprises a transformer and a rectifier B used for transforming 6 v., D. C., to the same voltage, namely approximately 300, as supplied by $T_2$, and for the same purpose. In order to assist in following the various circuits, the lines having 110 v. thereon, are indicated by wavy lines. The common return for all of the operating circuits is indicated by a straight, heavy line, which may be termed the ground return, indicated by the letter G.

S (see Figure 2) diagrammatically illustrates a three-position, 12-circuit supply switch for controlling various circuits to which reference will be hereinafter made. As indicated on Figures 1 and 2, the broken line, designated by the letter S, indicates all the members operated by this switch-knob or handle. The numbers 1 to 12 inclusive, indicate the switch members that are moved by the knob or handle S, and the numbers 13 to 31 inclusive, are the fixed contacts which are brought into circuit engagement with the movable contacts 1 to 12 inclusive.

$R_1$ to $R_{12}$ inclusive, are a series of magnetic relays used in the various parts of the circuit, and it may be noted at this point that in the specification all moving relay contacts on each relay are considered as moved by one armature.

$R_1$ starts the time-lapse cycle.

$R_2$, among other things, controls the application of the power supply from the source of power to the timing devices.

$R_3$, in conjunction with $R_2$, controls the charging of the timing devices.

$R_4$, in addition to holding on the power supply, serves to activate other relays to which reference will be made in the general description of the operation—and by activate I mean to hold part of a circuit closed which may be open at some other place.

$R_5$ and $R_6$ act to control the camera shutter, and control the exposure period.

$R_7$ controls the lights illuminating the subject being photographed.

$R_8$ terminates the exposure period.

$R_9$ is used to activate the camera.

$R_{10}$ terminates the exposure when the exposure is being controlled by the maximum exposure time control.

$R_{11}$ is a curtain control relay.

$R_{12}$ is a ratchet relay.

$D_1$, $D_2$ and $D_3$ are thermal delay relays, $D_1$ being used in connection with giving a warning signal before exposure starts. $D_2$ delays the lights after the camera shutter opens. $D_3$ controls the maximum exposure time.

$N_1$ to $N_6$ are electronic relays which are indicated as being of the neon type.

$N_1$ and $N_2$ may be referred to as trigger tubes or relays having an ignition voltage of approximately 75 and an extinction voltage of approximately 45.

$N_3$, $N_4$ and $N_5$ are voltage regulator tubes or relays, $N_3$ and $N_4$ having an ignition voltage of approximately 85 and an extinction voltage of approximately 70; while $N_5$ has an ignition voltage of approximately 65, and an extinction voltage of approximately 50.

$N_6$ is a time-lapse trip tube or relay having an ignition voltage of 90 and an extinction voltage of 50.

$C_1$ to $C_{15}$ are condensers used in the system.

$C_1$ to $C_4$ control the timing cycles, the voltage of $C_1$ being regulated by tubes $N_3$ and $N_4$, $C_1$ also acting as a supply condenser for the circuit, including $N_1$ and $N_2$.

$C_2$ is the exposure timing condenser, and is shown adjustable by the switch $S_1$.

$C_3$ is the supply condenser whose starting voltage is controlled by the tubes $N_3$, $N_4$ and $N_5$, and is the voltage supply for the time-lapse period. Its capacity is preferably much greater than the capacity of $C_4$.

$C_4$ is the timing condenser for the time-lapse period.

$C_5$ and $C_8$ are primarily lagging condensers.

$C_6$ is a filter condenser, and $C_7$ is a buffer condenser, while the rest are point-protecting condensers.

$w_1$ to $w_9$ are resistances.

$w_4$, $w_5$ and $w_6$ are variable resistances of relatively high value, $w_4$ and $w_5$ being about 5000 megohms, and $w_6$ about 200 megohms.

$w_3$ is a lagging resistance of about 15,000 ohms.

While I have indicated a resistance $w_2$ in series with the primary of the transformer $T_2$, this may, in some cases, be omitted.

$w_1$ is a resistance of approximately 4000 ohms to provide the necessary voltage drop across the neon tubes.

$w_7$ is a point-suppressing resistance.

$w_8$ is a timing resistance.

$w_9$ is a variable timing resistance of approximately 20 ohms.

P is a photo-electric cell which may be of the electronic or resistance type.

V is an electrostatic voltmeter for indicating the progress of the time-lapse period.

BH is a rectifier for rectifying the high voltage from A. C. to D. C. for the timing devices.

I is an infinity switch for making the time lapse period infinite arbitrarily.

The broken line X indicates the casing surrounding the parts shown encompassed thereby, and indicates a sealed de-hydrated chamber, within which these parts may be mounted.

O represents, generally, the optical system, from which light coming from the subject is transmitted to the photo-electric cell P, $m$ being a viewing mirror for properly locating, on the ground glass, the light coming from the object or part thereof that is to be photographed. The mirror $m$ is mounted so that it can be removed from the path of the light going to the photo-electric cell P after this observation has been made; or the mirror may be so made that it will transmit say 90% of incident light while reflecting only 10%, and may be permanently mounted in a position such as shown in Figure 1. It may be mentioned that the filter F is for correcting the spectral intensity curve of the photo-electric cell P to match that of the film being used in the camera. The mask may be of the variable iris diaphragm type, or a series of fixed masks to correspond with different focal lengths of the camera lens. The diaphragm may be a variable iris diaphragm or a series of fixed diaphragms.

Figure 2:
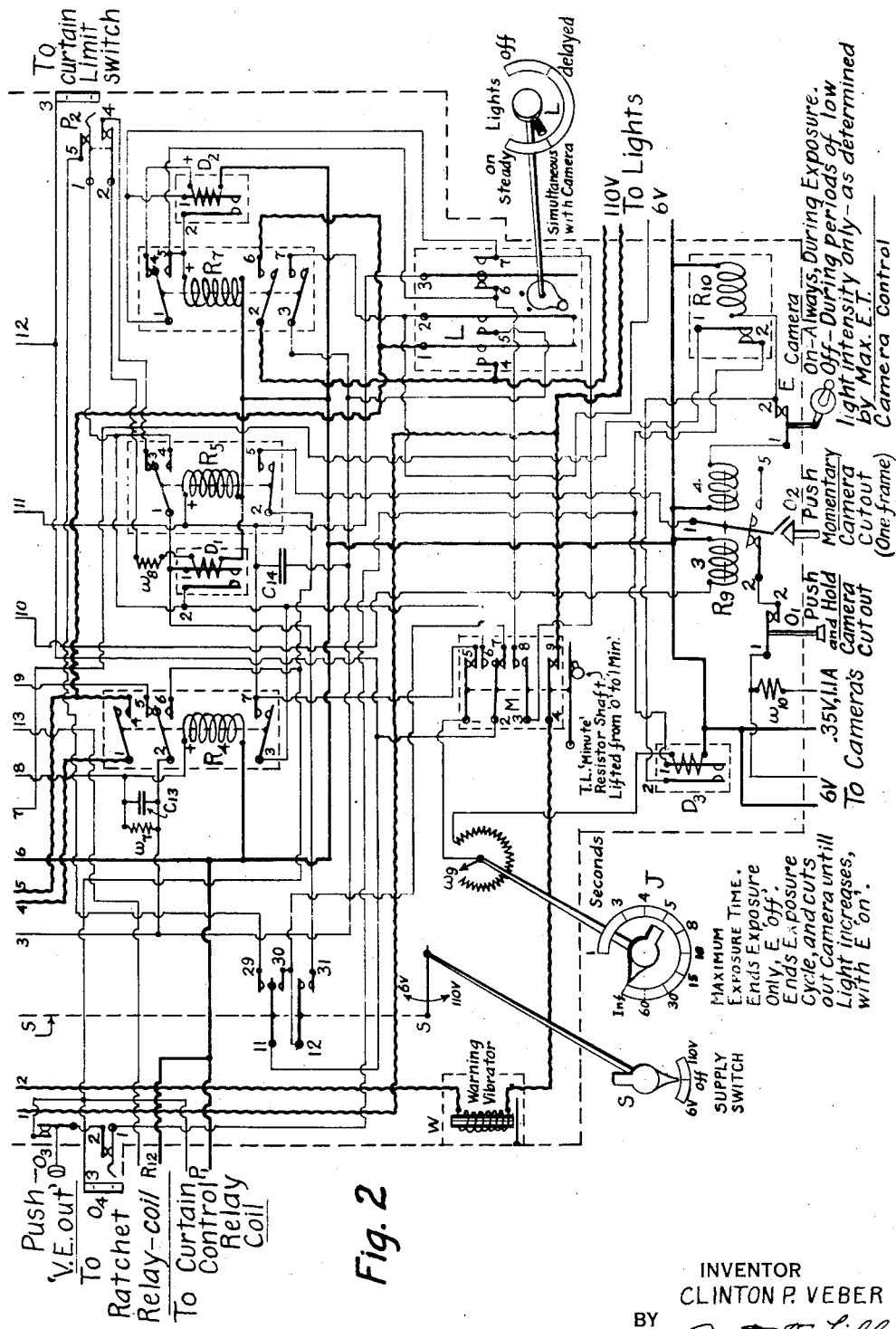

Referring to Figure 2, L is a light switch of four positions which controls the application of the artificial lights on the subject. M is a series of contactors operated by the time-lapse "minute" resistor shaft. As shown in Figure 1, the shaft M is also connected to the operating shaft of the timing resistor $w_5$. When fractions of a minute are desired, the "seconds" controller is operated, which controls the resistor $w_6$.

H is an exposure time modulator control serving two purposes: In the upper quadrant, as indicated in Figure 1, it serves strictly as an exposure modulator. In the lower quadrant it serves as a constant exposure control, the controller being connected to the resistor $w_4$. When working in this quadrant, the lens should be covered as indicated on the drawing, in which case, the potentiometer $w_4$ entirely controls the integration instead of light through the photo cell P.

J (see Figure 2) is a maximum exposure time control connected to the resistor $w_9$.

$O_1$ and $O_2$ are push-button switches for the purposes indicated—to act as camera cutouts.

E is a switch used in connection with the operation of the camera.

W is a warning signal used to give warning before exposure takes place.

While I have outlined above, only the general nature of the various pieces of apparatus which I have found successful in operation, it is to be understood that any values assigned are merely for illustrating the purposes, which will be clear from the following description of the operation of this apparatus when connected in the circuit arrangement substantially as shown in Figures 1 and 2. In order that the various objects of the invention and the operation of the various parts of the mechanism may be understood, one or more operating cycles will now be described.

Let it be assumed that:

First: The machine or apparatus is to be operated from 110 v., A. C. source of power.

Second: The time-lapse period is greater than one minute; for example, two minutes, whereby the series of contacts operated by the shaft M will remain, during the cycle, in the same position as shown in Figure 2, which means that the warning signal and delay is set for operation, and that lights will work as indicated at light-control switch L.

Third: This light-switch L is turned to the position marked "Delayed".

Fourth: The normal exposure period for this cycle will be about ten seconds, and that this exposure is being made at night, and that artificial lights have failed, due, for example, to some cause such as burned out lamps.

Fifth: That the maximum exposure time, ET, is set for thirty seconds.

Sixth: That the exposure time modulator H is set at normal, position I on upper quadrant, Figure 1; or so that total leakage across the photo-electric cell P balances the total leakage across tube $N_2$, and the potential of $C_2$ will not change as long as no light strikes the photo-electric cell P.

Seventh: That no ratchet relay or curtain is being used.

It has been assumed that the switch S is turned to 110 volts, after this current-supply has been plugged into the machine. If it be assumed that the condenser $C_3$ has retained its charge from a previous operation, the condenser $C_3$ will gradually discharge into $C_4$ through $w_5$, $w_6$, contacts 2—5 of $R_3$, and $S_{10-28}$, and through the normal position of switch I which, when moved to open the contacts $I_{1-2}$, will produce an infinity time period which will be later described. When the charge on $C_4$ has been built up to the ignition point of $N_6$, then $C_4$ will discharge through $N_6$, $w_3$ and $R_1$. The armature of $R_1$ is now operated and contacts 1—2 of $R_1$ are closed. This connects the 110-volt current to the primary of transformer $T_1$ through the medium of contacts $S_{7-23}$ and $S_{6-21}$ and $S_{3-17}$. Current is then supplied from the secondary of the transformer $T_1$ and rectifier associated therewith through $S_{8-25}$, lead 3, to 2—5 of $R_4$ (Figure 2), lead 9, $S_{5-19}$, through the winding of $R_2$. The armature of $R_2$ is operated and remains operated for a very short period, even after its circuit is opened, as will be later described, by 2—5 of $R_4$, because of the lagging condenser $C_5$, which may be of the electrolytic, low-voltage, high-capacity type, of the order of 500 mf., and which condenser is permanently connected across the winding of $R_2$. The total time that the armature $R_2$ is operated will be in the neighborhood of ½₀ second.

As the armature of $R_2$ starts to move to actuated position, it closes contacts 2—6, 3—8 and 4—9 of $R_2$. Almost simultaneously thereafter, contacts 3—8—7 of $R_2$ are closed, followed by the closure of 1—5. The closure of contacts 2—6 of $R_2$ activates the primary of the transformer $T_3$, including the rectifier B, but $T_3$ is inoperative because the machine, as has been explained, is being worked from a 110-volt circuit, and the supply circuit to $T_3$ is opened at contacts $S_9$—$_{26}$. Contacts 3—8 of $R_2$ close the circuit to the primary of transformer $T_2$ through resistor $w_2$, if this resistor is used and contacts $S_4$—$_{18}$. The circuit is also closed through the line 2 through the warning signal W (Figure 2), and contacts 4—9 of M, and back on the other side of the circuit to the lead 1. A warning will be given by the signal $w$, warning anyone, who may be in front of the camera, that an exposure is about to be made.

Contacts 3—8—7 of $R_2$ keep the $T_1$ supply circuit closed after the de-energization of $R_1$, and the contacts 1—2 thereof are opened. Contacts 1—5 of $R_2$ close a high-voltage supply to the time-lapse (TL), and variable exposure control (VE) supply condensers $C_1$ and $C_3$. On closure of the contacts 1—5 of $R_2$, the tube $N_5$ ignites, since $C_1$ has been discharged by the last cycle to a low voltage. $C_1$ then begins to charge through $N_5$. Contacts 4—9 of $R_2$ directly actuate the coil of $R_3$. Contacts 2—5 and 3—8 of $R_3$ break almost simultaneously, and shortly afterward contacts 2—6 and 3—7 of $R_3$ are closed.

Contacts 1—4 of $R_3$ are closed last and connect outside voltage supply to $C_3$ through 1—5 of $R_2$. Since contacts 2—5 of $R_3$ are now open, no surge can be applied to condenser $C_4$ from the supply circuit of $C_3$ and thereby throw out the timing which is principally controlled by $C_4$ and $N_6$. Contacts 1—4 also serve another very important function and that is, when they are normally open, the condenser $C_3$ is prevented from discharging back through the leads extending from the sealed chamber, and into the apparatus connected to said leads, and this is a further reason why these contacts open first before the other contacts of $R_3$. Another function of the contacts 1—4 is to isolate the high side of $C_3$ and $C_4$ within the sealed chamber, so that humidity conditions will not discharge these condensers; also, so $C_3$ will not discharge through $N_5$ at the end of ET, when the potential of $C_1$ drops.

Contacts 2—6 of $R_3$ short-circuit $C_4$ so that it will begin to take its timing charge from zero potential. Contacts 3—8 of $R_3$ de-activate—and by de-activate I mean opening a circuit which is already open in another place—$R_5$, $R_6$, $R_7$ and $D_1$ so that integration will not begin until $C_1$, $C_2$ and $C_3$ are charged, and voltage regulating tubes $N_1$, $N_2$ and $N_3$ extinguished.

Contacts 3—7 of $R_3$ close a circuit through a coil of $R_4$. As soon as $C_1$ has been charged to ignition potential of $N_3$, plus residual charge on $C_2$, and $C_3$ to that plus the sustaining voltage of $N_5$, then $N_3$ ignites and $C_2$ begins to charge through 1—5 of $R_2$ and $N_5$—$N_3$ until it reaches the breakdown potential of $N_4$. Sufficient time is allowed by lagging condenser $C_5$, previously referred to, to permit $C_1$, $C_2$ and $C_3$ to be thus charged up to the sustaining voltage of the tubes they are in parallel with.

At the end of the lag period, the armature of $R_2$ starts to release, and 1—5 of $R_2$ opens the condenser supply line. Now tubes $N_5$, $N_3$ and $N_4$ remain glowing as $C_1$, $C_2$ and $C_3$ start to discharge back through them. If 1—5 of $R_2$ were to open after the supply to $T_2$ had been opened through 3—8 of $R_2$, then there would be a tendency for the condensers to discharge back through the dead secondary of $T_2$ and the BH rectifier, so that the starting voltage or remaining charge of the condensers would be too low. When the potentials of $C_1$, $C_2$ and $C_3$ reach extinction voltages of the tubes with which they are in parallel, the tubes go out, probably all at once, thus isolating these condensers and leaving them with proper starting potentials.

As the armature of $R_2$ continues its release movement, contacts 3—7 open the local supply circuit to $T_1$, which remains in operation, however, due to previous closure of 1—4, $R_4$. As the armature of $R_2$ fully releases, contacts 3—8 open, shutting off the warning signal W and opening the supply circuit to $T_2$, contacts 2—6, $R_2$ open and de-activate $T_3$, and 4—9, $R_2$, open the coil of $R_3$, which remains actuated momentarily, due to the small lagging condenser $C_8$, to help insure time enough for a complete discharge of $C_1$, $C_2$, $C_3$, to starting voltage and complete de-ionization of $N_3$, $N_4$ and $N_5$, before integration begins. This, incidentally, is the main reason that $R_2$ and $R_3$ are separate relays and that $R_3$ is controlled by contacts on $R_2$.

Meanwhile 3—7 of $R_3$ has closed a circuit through the coil of $R_4$. On operation of $R_4$, contacts 2—5 open the circuit of $R_2$ as previously noted, and contacts 3—7 of $R_4$ have activated $D_1$, $R_5$, $R_6$, $R_7$ and $D_2$. Also, as noted, 1—4 of $R_4$ take up the function of keeping the supply circuit to $T_1$ closed before 3—7 of $R_2$ opens, and keeps the said supply circuit closed for the duration of the exposure. Contacts 2—6 of $R_4$ hold $R_4$ operative through $O_3$, 1—2 of $O_4$ and 1—2 of $R_{10}$, then through 1—2 of $R_8$ and $S_8$—$_{25}$.

Shortly after the tubes $N_3$, $N_4$ and $N_5$ have been extinguished, the armature of $R_3$ starts to release, and 1—4 of $R_3$ de-activates the supply lead to $C_3$. Contacts 2—6 of $R_3$ open the circuit across $C_4$ and 2—5 of $R_3$ close the circuit between $C_4$ and $C_3$. Therefore, $C_3$ begins to charge $C_4$, which is the TL timing condenser, through $w_5$, $w_6$, contacts 1—2 of I and $S_{10}$—$_{28}$, and continues to charge the condenser $C_4$ for the remainder of the cycle indicated by the line Y' in Figure 3. If desired, contact 6 of $R_3$ could be eliminated, in which case $C_4$ would discharge only to extinction voltage of $N_6$ and would begin taking its next timing charge at this potential. For given values of $w_5$ and $w_6$, the TL period would be considerably less than if $C_4$ is shorted, and timing might tend to become somewhat more erratic. It may also be found desirable to break the connection to the positive side of $N_5$, and connect the leads to additional contacts on $R_3$, so that the circuit through $N_5$ will be completed only when $R_3$ is actuated.

At the same time that $C_4$ is being charged, 3—8 of $R_3$ closes a circuit to the coil of $D_1$ through $M_2$—$_7$, $S_{11}$—$_{30}$, $S_{12}$—$_{31}$, 1—3 of $R_5$, 2—4 of $P_2$ and $w_8$. The purpose of $D_1$ normally is to provide a suitable time interval between the sounding of the warning W and the start of exposure, preferably about ten seconds. After the interval of ten seconds, the contacts 1—2 of $D_1$ close a circuit through the coil of $R_5$ by way of $S_6$—$_{25}$, 3—8 of $R_3$, lead 12, $S_{11}$—$_{30}$, $S_{12}$—$_{31}$, contacts 1—2 of $D_1$ and 3—7 of $R_4$. Simultaneously, current passes through lead 11 and relay $R_6$, actuating the same which is permanently in parallel with $R_5$, and in parallel with heater coils $D_2$ and $D_3$, the circuit through $D_2$ being completed through contacts $L_3$—$_7$ and 1—4 of $R_7$, and circuit through $D_3$ being completed through $M_1$—$_5$ and $w_9$, the assumption for this particular operation being that the switch L is set at "delayed". As the armature of $R_5$ starts to close, contacts 1—3 of $R_5$ break and open the line to the heater coil $D_1$. Almost immediately thereafter, contacts 1—4 of $R_5$ make contact and retain $R_5$, as well as $R_6$, in operative position. Movement of contact 1 of $R_5$, as incidentally also 1 of $R_7$, is small to prevent chattering or buzzer action, since the thermal element of $D_1$ will cool very quickly, enough to break the circuit through coil $R_5$. For this reason, and so that $R_5$ may remain in operated position before performing any other function, contacts 2—5 of $R_5$ are the last to close and actuate the trip coil of the camera through $S_{8-25}$, contacts 2—6 of $R_4$, 2—5 of $R_5$, 1—2 of $R_9$, 1—2 of $O_1$, and through "plug-ins" connecting the cameras with the time-lapse machine, thus opening the camera shutter and starting the exposure.

At practically the same instant, contacts 1—3 and 2—4 of $R_6$ close and start the integration of light by connecting the anode of photo-electric cell P to the high positive side of $C_1$, and negative side of $C_1$, to the negative side of $N_2$, through the coil of $R_8$. Since no light strikes the photo-electric cell P under the assumption made; i. e., that the artificial lights are out of commission and the leakages balance—since it has been assumed that the exposure modulator is turned to normal position—nothing happens, and the potential of $C_2$ remains constant. Although artificial leakage $w_4$ of the exposure modulator is directly across $C_1$, as well as the inherent leakage of photo-electric cell P and $C_2$ in series, the potential of $C_1$ will remain practicaly constant for perhaps one-half hour, because this leakage resistance is very high. It may be mentioned at this point that $D_2$ is a "lights-after-camera" delay and acts to keep the lights from going on in the daytime or as long as exposures are under three seconds' duration.

In about three seconds, the heater coil of $D_2$, which is temporarily in parallel with $R_5$ and $R_6$, gets hot enough to cause contacts 1—2 of $D_2$ to close a circuit to $R_7$, the light relay, through $L_{3-7}$. As the armature of $R_7$ starts to close, 1—4 of $R_7$ break and open the circuit to heater coil $D_2$. The contacts 1—5 of $R_7$ close and hold $R_1$ in operated position through $L_{3-7}$. Finally, contacts 2—6, 3—7 of $R_7$ close, contacts 2—6 switching the 110-volt lights on the subject, and contacts 3—7 switching on the 6-volt lights when used, and, incidentally, these contacts may actuate a coil on an external, heavy-duty relay when light requirements are very heavy.

Since, on the assumption that the 110-volt lights are burned out or otherwise disabled during the particular cycle, the only thing that happens is that the heater coil of $D_3$ is gradually warming up the thermal element associated therewith. The maximum ET control J, which is merely a 20-ohm variable resistance $w_9$ in series with the coil of $D_3$, is set for thirty seconds; so at the end of this interval, the thermal element of $D_3$ is hot enough to cause contacts 1—2 to close, thereby completing a circuit of $R_{10}$, which is actuated and opens a circuit through $R_4$, and ends the integration and exposure. The de-energization of $R_4$ opens the contacts 2—6, de-activating $R_4$; opening the camera circuit and circuit through the coil of the curtain control relay, if the curtain system is in use; opening the contacts 1—4 opens the 110-volt supply line to $T_1$; closure of contacts 2—5 re-activates $R_2$, and opening of contacts 3—7 of $R_4$ de-activates $D_1$, $R_5$, $R_7$, $R_6$ and $D_2$. Opening of the transformer $T_1$, of course actually releases $R_5$, $R_6$, $R_7$ and $D_3$, since this cuts off the six-volt supply, it being understood that preferably all relays, except the timing relays, operate on six volts, whereby the machine is capable of use in the field where a six-volt battery such as used on automotive vehicles, may be readily obtained; and when the machine or apparatus is used where 110-v. A. C. is available, this is converted to six volts D. C. by $T_1$ for the particular relays mentioned.

The trigger neons $N_1$ and $N_2$, and relay $R_8$ do not function under the assumptions made, since there was no light during this cycle, and this particular frame or portion of the film would be blank, of course, and would probably have to be cut out later, as would all other frames made during successive cycles where there were no lights. However, the exposure would have been terminated and the elements in connection with the exposure period turned off, so that they would not unduly heat up nor allow the camera to heat up—and if this should happen when battery-operated, it would prevent running down the battery.

The only thing happening now during the remainder of this cycle, is the gradual discharge of $C_3$ into $C_4$. As soon as the potential of $C_4$ reaches the ignition point of $N_6$, the TL interval of two minutes will be passed and a new cycle will begin.

Let it be assumed for the next cycle that the following conditions exist:

(1) That the machine is operating altogether from a 6-v. source of power; that is to say, the switch S is thrown in reverse position from the previous cycle.

(2) That the TL period is under one minute, say 45 seconds, and therefore the M contactor will now be in raised position, opening contacts 4—9, 2—7 and 1—5, and closing contacts 3—8 and 2—6. Under this condition and for the reasons heretofore pointed out, the warning signal W will not sound and warning delay will not occur. Even though the light switch L be in "delayed" position, the lights will work simultaneously with the camera anyhow, since no light delay is possible because the delay relays $D_1$, $D_2$, $D_3$ and the warning signal W are cut out by the switch M which is operated when the time-lapse period dial is moved to the assumed time-lapse position of 45 seconds.

(3) That the light switch L is in "simultaneous" position.

(4) That the normal ET for this cycle is about one second, and that the exposure is being made in daytime, and that, therefore, the lights may or may not be used.

(5) That the exposure modulator H is set to a position, such as .25, upper quadrant so that on low-light values the leakage across photo-electric cell P is considerably greater than the leakage across $N_2$ for reasons which will be hereinafter set forth.

(6) That the ratchet relay and curtain relay and system is not being used.

Under the above assumptions, $C_4$, after its potential has been built up, discharges through $N_6$ and $R_1$, as before. The armature of $R_1$ is drawn up and closes contacts 1—2. Since the position of the switch S has been changed from 110 v. to 6 v., $R_2$ is now in series with the 6 v. source of current, and 1—2 of $R_1$ through $S_{7-22}$ and $S_{6-20}$, lead 9, contacts 2—5 of $R_4$, and $S_{8-4}$. $R_2$ is thus actuated through contacts 1—2 of $R_1$. After the armature of $R_1$ is actuated, and released, and its contacts opened, $R_2$ remains actuated for about $\frac{1}{20}$ second, due to the lagging condenser $C_5$. The period of closure of $R_2$ is, in this case, a trifle shorter, probably on the order of $\frac{1}{50}$ to $\frac{1}{100}$ of a second, than in the cycle previously described, because the circuit through $R_2$ is opened by 1—2 of $R_1$, rather than 2—5 of $R_4$, as in the first case described. This, however, is an immaterial difference.

From this point on, the operation sequence is the same as in the cycle previously described, down to and before actuation of the heater coil of relay $D_1$ by 3—8 of $R_3$. In the present assumption, contacts 3—8 of $R_3$ close a circuit through $R_5$ and $R_6$, by way of $S_{11-29}$, 1—5 of $P_2$ and 3—7 of $R_4$, thus starting the camera, integration, etc., without any warning delay. Also, contacts 3—8 of $R_3$, through $S_{11-29}$, 1—5 of $P_2$, 307 of $R_4$, and $L_{3-6}$ close a circuit through $R_7$ which will turn on the lights at the same time as the camera, assuming that they are plugged in.

It will be noted that when $R_7$ is actuated, the contacts 1—4 immediately open so that no circuit is completed through the coil of $D_2$, thereby keeping the light delay out of circuit. Also, since $M_{1-5}$ is open, the heater coil of $D_3$ is open as previously explained, and the maximum ET control is inoperative. All other functions of $R_5$, $R_6$ and $R_7$ take place as before.

For the next second, integration takes place—and what is meant by integration is that light, falling on the photo-electric cell, causes current to flow from $C_2$ in spite of minute leakages knowingly caused by the exposure modulator, and other inherent minute leakages which have been compensated for by the exposure modulator proper and capacity distribution of $C_2$, and other ways. Since there is considerable light now falling on the photo-electric cell P, appreciable current is caused to flow through it from $C_2$. Current is also flowing from $C_2$ through $w_4$ to the positive side of $C_1$, since the resistance of $w_4$ on the photo-electric cell side is now lower than the resistance on the $N_2$ side. This $w_4$ current is very small in comparison with the photo-electric cell current and may be neglected, and the frame or film section would be normally exposed. However, in future cycles, when light on photo-electric cell P may decrease, whereby normal ET may be twenty or thirty seconds, current through P may not be even as great as that through $w_4$, in which case the potential of $C_2$ might be raised twice as fast and the ET would be only half as long as a normally exposed frame would require, under the decreased light intensity on the subject, and the frames or film would then be under-exposed by approximately 50%. The converse can be attained, if desired, both results being the modulation effect produced by the modulator H. This is the modulation effect which can be produced by the modulator H.

If this modulator control had been set to some point in the lower quadrant, say at eight seconds, and the lens covered, then the exposure time would be governed entirely by $w_4$ and all exposures made at this setting would be constant at eight seconds. Therefore, in this quadrant, with the lens covered, the exposure modulator also serves the purpose of constant exposure control. If it is desired to eliminate the exposure modulator, for instance where very long ET is wanted, the function of the modulator as a constant exposure control could be accomplished either by a light bulb, preferably six volts, located inside the machine near the photo cell and equipped with a variable resistance which would control its intensity, preferably during exposure, in relation to the timing desired; or by a very high variable resistance connected through a switch across the photo cell. In all cases where constant exposure is required, the lens in the optical system O would have to be covered unless a cutout means were provided.

As soon as the potential on $C_2$ has been raised to ignition of $N_2$, $N_2$ will ignite and $C_2$ will begin to discharge through it by way of contacts 2—4 of $R_6$ and relay $R_8$. This primary action will have no effect on $R_8$, however, since the current is infinitesimal. Before the discharge of $C_2$, which takes place relatively slowly, due to the high impedance of $R_8$, approximately 10,000 ohms, reaches extinction potential of $N_2$, the potential across $N_1$ will be increased until breakdown of $N_1$ occurs. When this happens, $C_1$ will discharge somewhat slowly, say $\frac{1}{20}$ of a second, through $N_1$, $N_2$, 1—3 and 2—4 of $R_6$, and $R_8$, until extinction potential of $N_1$, $N_2$ is reached. The voltage across and current through $R_8$ will now be sufficient and of ample duration to actuate its armature. The voltage across $R_8$ is equal to the potential across $C_2$ when $N_1$ ignites, plus the ignition potential of $N_1$, minus the sustaining voltages of $N_1$ and $N_2$. This action is called "triggering" and $N_2$, in this case, is the trigger. Its action does not depend on induced ionization as in the case of the grid glow tube, although $N_1$ and $N_2$ could be replaced by such a tube, as could also $N_3$ and $N_4$.

As the armature of $R_8$ is actuated, contacts 1—2 thereof open, thus breaking the circuit through 2—6 of $R_4$, $O_3$, 1—2 of $O_4$ and 1—2 of $R_{10}$. This shuts off camera and light relays as follows.

2—6 of $R_4$ opens, thus de-activating $R_4$ coil which is again activated later when the armature of $R_8$ releases. The opening of contacts 2—6 of $R_4$ also causes the camera shutter to close, and a fresh film frame would be drawn into place. If this action had been controlled by contacts 2—5 of $R_5$, which open somewhat later than 2—6 of $R_4$, and if camera had been cut out for this cycle by $O_2$, then the actuation of the camera by 1—2 of $R_9$ might occur before the camera circuit was de-activated, in which case the camera would receive a momentary surge of power which would cause a frame to be run off with little or no exposure. Contacts 2—6 of $R_4$ would also open the circuit to the coil of a curtain control relay, if a curtain system were being used, thus causing the curtains to return to their normal or starting position.

Contacts 2—5 of $R_4$ close and re-activate $R_2$, while 3—7 of $R_4$ open and release $R_5$, $R_6$ and $R_7$. When contacts 3—4 of $R_8$ close, coil 3 of $R_9$ is energized, and if the camera circuit had been broken for some reason through 1—2 of $R_9$, it will be closed, so that when the next cycle occurs, the camera circuit will be closed through 2—5 of $R_5$. Now, as in the last cycle, the only action taking place is gradual discharge of $C_3$ into $C_4$, and at the end of the assumed period, 45 seconds, $C_4$ reaches the breakdown potential of $N_6$ and discharges through it and $R_1$ relay, starting a new cycle.

Figure 3:
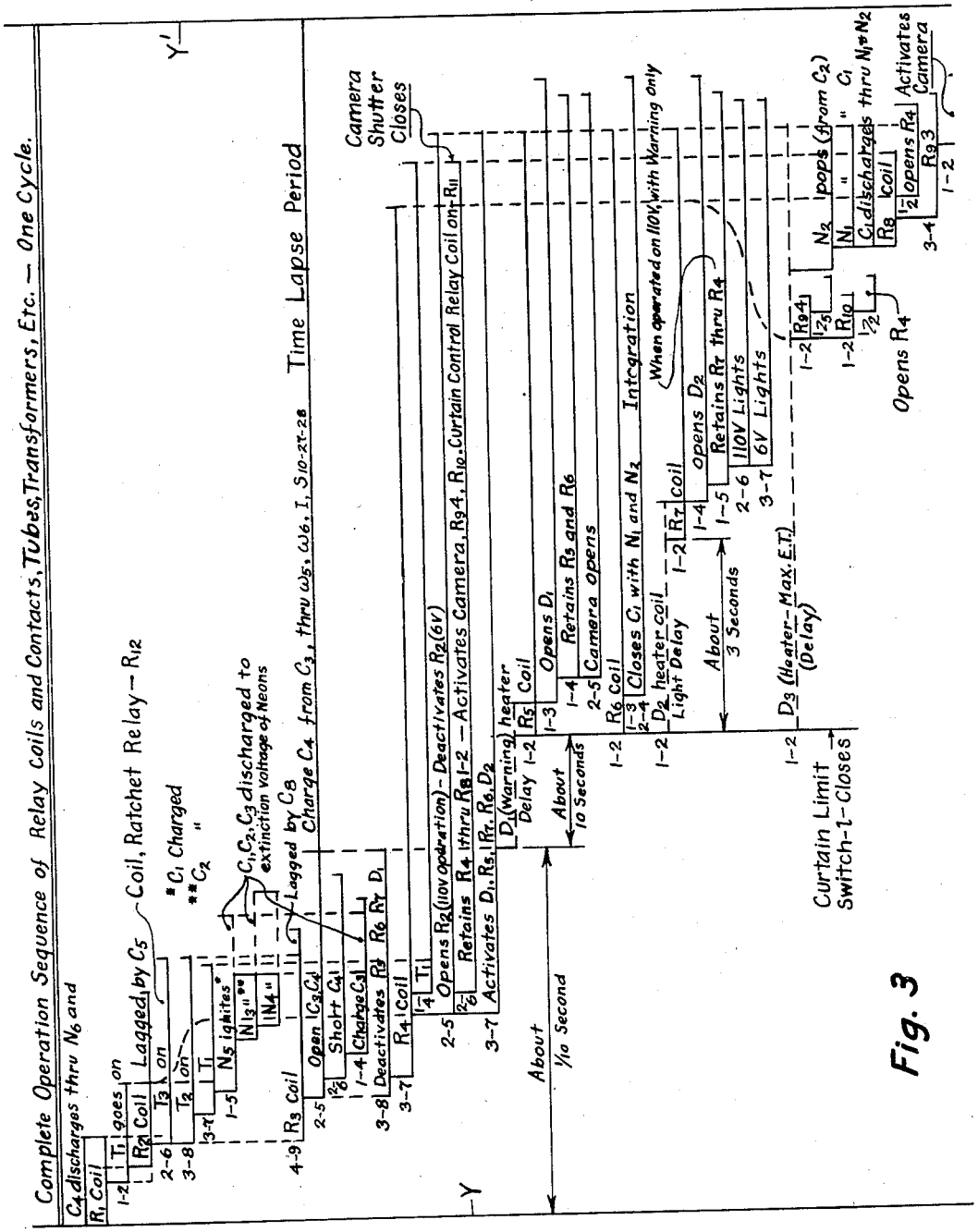
Figure 3 is a chart which graphically shows, in proper sequence and approximate duration, the various operations of each significant element. It is included to make as clear as possible a logical understanding of a somewhat complex series of events.

The cycles previously described may, perhaps, be followed more clearly by reference to the chart of Figure 3, which shows the complete operation sequence of the relay coils and contacts, tubes, transformers, etc., during one cycle. Referring to Figure 3, the small numbers to the left of the vertical lines indicate relay contacts. The horizontal lines immediately below and to the right of the numbers indicate the approximate length of time the contacts remain closed or open. The letters or designations on top of the horizontal lines indicate the parts controlled by the contacts. Since there is an appreciable length of time between the closing of the circuit of the relay coil and the closing or opening of its contact points, this time delay is shown by the stepped arrangement of the vertical and horizontal lines. For example, the difference in time is shown by a short vertical line below and to the right of the coil with which the contacts are associated.

To illustrate: In the upper left-hand corner of the diagram, contacts 1—2 are shown to the right of the line Y a certain distance, indicating the time after current has been supplied to the coil of $R_1$. In Figure 3, it will be noted that the relays $R_1$, $R_2$, $R_3$ and $R_4$ operate within $\frac{1}{10}$ second, and if the warning signal and subsequent delay is used, relays $R_5$, $R_6$, etc., operate at the end of the warning delay period; but if, as in the second assumption, the warning signal, delay and light delay are not used, then the magnetic relays, including $R_5$, $R_6$ and $R_7$, will operate within the same short period as $R_1$, $R_2$, $R_3$ and $R_4$. It is for this reason that horizontal lines under the heater coils of $D_1$, $D_2$ and $D_3$ are indicated as broken lines, implying that time gaps indicated by "about 10 seconds" and "about 3 seconds" will, in this case, become zero, and the events, such as actuation of $R_9$ and $R_{10}$, brought about under the first assumption previously made by operation of 1—2 of $D_3$, will not occur.

In order to make this series of events clearer as described, it may be well to note that the TL and ET periods are separate and distinct periods, and that throughout this described series of events both start at the same time, as indicated in the upper part of Figure 4, from which it is seen that the length of exposure does not affect the actual time lapse period, which will always be uniform unless the exposure time should run longer than the TL period, in which case, the TL period would be extended until the ET terminated, and then simultaneously start new TL and ET periods. The lower part of Figure 4 shows another method, which is step-by-step, in which the TL period does not start until the ET period has terminated. This latter step-by-step method could be used, if desired, by suitable contacts on relay $R_4$, or a relay operating in parallel therewith, but it has the disadvantage, in case exposure periods vary greatly, of making the TL periods non-uniform, which would mean that the pictures would not be taken uniformly and therefore, in reproduction, would be non-uniform with respect to time.

In Figure 1, I have shown a single momentary push-button switch which can be operated to function as a starting trip or exposure trip. After long periods of dis-use, say months or years, this push-button may be operated, which performs the same functions as the switch contacts 1—2 of $R_1$ and will thus act to recharge the condensers $C_1$, $C_2$ and $C_3$, which will place the machine in condition for the sequence of cycles as heretofore described. As a matter of fact, one cycle will be completed on pushing the button, and if the button is held in closed position, a series of exposures will be made as rapidly as light conditions permit with a sort of "machine-gun" action. Also, it will be readily seen that an exposure can be made at any time by the pushing of this button, without affecting the continuous operation of the machine. An extension trip may be provided as indicated, whereby the exposures can be controlled at a distance from the machine, such as when "panoraming" or "zooming" with the "dolly" on which the camera and time-lapse machines may be mounted; or a synchronous motor, provided with a suitable timing clutch or equivalent, could be used for long or extremely accurate TL periods. In this latter case, TL switch I would be turned to "infinity" position.

The machine and camera may be made to readily dissipate heat in order that the machine may be safely operated without maximum ET control, in which case, the control could be set to infinity, or eliminated. When operating without this control, and if anything should happen, such as lights burning out at night, exposure would continue until light was again available.

It is also preferable that all leakages across the two parts of the triggered neon circuit be balanced, even for moderate changes in temperature, in order that potential across $C_2$ should at all times correspond to the actual amount of light collected. It would also be necessary that all leakage across $C_1$, including exposure modulator resistance, be kept low enough so that the potential of $C_1$ would not be appreciably lowered even at the longest possible exposure periods. To do this, the exposure modulator could be eliminated or made with very high resistance, and $C_2$, preferably made constant instead of variable, could be distributed across both the high side and low side of the trigger circuit, instead of only across the low side. Any such distribution in any proportion would not affect timing.

Since condenser leakage varies directly with capacity and increases with temperature, and since the high side of the circuit usually leaks more than the low side at elevated temperatures, proper distribution of capacity $C_2$ will neutralize or equalize these leakages at all reasonable temperatures, providing proper quality and quantity of capacity is used.

If it is desired to have $C_2$ variable and still retain the temperature compensating effect of properly distributed capacity, this can readily be done if proper precautions are taken in the selection of materials, proper construction and mounting or arrangement of the condensers used in the trigger circuit, whereby the leakages of these condensers are so minute that they may retain their charge for even weeks or months without large loss, and will be very stable in operation. It probably will be found desirable that these same constructional precautions be taken with all the timing condensers and their supply condensers, including $C_1$, $C_2$, $C_3$ and $C_4$.

When very long exposures are possible, such as all night, though probably not contemplated, the exposure modulator, in addition to having very high resistance, should be turned so that the high and low side leakages will exactly balance as nearly as possible. If high side leakage is slightly greater, the potential of $C_2$ will gradually increase and finally trigger the circuit despite the fact that no light was present.

The exposure modulator could actually be thus used as a maximum exposure time control. If a pair of trigger neons were being used, and the low side leakage was greater, the same exposure-terminating effect would take place, since the high-side neon would then become the trigger. If, however, a grid glow tube, operated by induced ionization, were used, the greater low side leakage would merely discharge $C_2$, assuming that $C_2$ is across the low side, although the greater high-side leakage would eventually terminate the exposure.

Since the resistance across the high and low sides, due to the exposure modulator, would usually be fairly well balanced in comparison with the voltage, even though the exposure modulator were being used at other than its normal setting, the effect in variation in resistance with temperature would not be excessive, as long as the temperature co-efficient itself is not too high, because it would be a compensating error. For this reason, it probably would not be desirable to try to make the exposure modulator correct for leakage in the rest of the circuit unless operation at a constant temperature were contemplated, or the relationship be very carefully worked out.

An important part of the mechanism heretofore referred to is the optical system O which includes the filter F. In the system shown and described herein, I prefer to use a caesium oxide type of photo tube, preferably gas-filled since this is considerably more sensitive than the vacuum type. It is desirable that all exposures be correct, regardless of changes in quantity of illumination during exposure, and it is thus apparent that current flowing into the VE timing condenser should be proportional to the light intensity at all times during exposure, regardless of voltage across either this condenser or the photo tube. Since my circuit is so arranged that the voltage across the photo tube varies on the order of only 100 to 95 volts during exposure, this voltage drop is so slight that the current will always be substantially proportional to the intensity of illumination. However, as will be later described, if a simple glow-discharge circuit, rather than the triggering circuit is used, or if it is desired that $C_2$ be shorted before integration begins, so that the voltage range across the photo tube during exposure is probably large, then the vacuum type photo tube is necessary, if it is desired that this current voltage relationship should remain constant during exposure. This caesium oxide tube may be operated on a high voltage circuit for the operation of the integrating circuit heretofore described.

The spectral sensitivity curve of a self-generating type of photo-electric cell, such as an iron-selenide or "photronic" type, might, in some cases, require less correction than the electronic, but the electrical characteristics of this cell will be more or less unsuited to the type of circuit heretofore described.

In the caesium oxide type of cell, the spectral sensitivity curve has large peaks in the infra-red and ultra-violet portions of the spectrum. It will be realized that this difference would be immaterial except in cases where the spectral intensity of the subject illumination varies considerably, such as when photographing by the light of the noonday sun, at sunset, or by artificial light at night. Since the system heretofore described, when operated with exposure control, does this, the necessity for correction is evident. With equal average intensity, it is evident that an exposure made at night with a VE minus a filter, would perhaps be somewhat shorter than that made at noontime; whereas, in order to get the same negative density, the night exposure would have to be very much longer. In order to make this correction, a filter combination which will make these spectral corrections, is used.

After lengthy investigation and many tests, I have developed a filter which will suppress the ultra-violet and infra-red portions so that the spectral sensitivity curve of the photo cell approximately matches that of the film. If the spectral sensitivity curve of the film used in the camera should, in effect, be changed, by placing a filter over the camera lens or using another type of film, it may be found desirable to place a similar or compensating filter over the VE lens which precedes the filter F in the optical system O.

If it is found necessary or desirable that the shift in color values from day to night—which might in some cases be accentuated, especially in color work, due to imperfections in the film or for other reasons, and the speed with which the film pictures might be projected on the screen—should be diminished or eliminated, this could readily be done in several ways, such as by using the "filter flood" light which converts ordinary artificial light into light approximating daylight quality; that is, suppresses, among other things, the peak in the red; the use of artificial light in daytime in sufficient quantity; suppression of natural light to some extent, such as by white-washing the outside glass of a green house, inside of which the time-lapse machine may be running; or by use of a filter on the camera, and in extreme cases, possibly the wedge type, and possibly photo-electrically regulated.

It may be found desirable, in some applications requiring exposure of the photo-electric cell to strong light for long periods of time, to shield it with a shutter which would open and expose the cell only during exposure time periods. This shutter may be worked by a magnet or solenoid connected in parallel with the coil of relay $R_5$, but to avoid confusion, this is not shown; besides, it would not ordinarily be required. Thus shutter would protect the photo cell elements from aging and/or fatigueing which would cause erroneous variations in exposure.

By using a ground glass in the manner indicated in the optical system O, the light striking the ground glass from the object through the lens is diffused and spread nearly uniformly over the cathode of the photo-electric cell, thereby largely compensating for areas of unequal sensitivity on the cathode of the cell.

By using a mask of the type heretofore mentioned near the ground glass, this TL machine can be used at all times alongside the camera, regardless of the focal length of the camera lens and the light to be integrated may be limited or extended to include that reflected from only a small section of the subject or from a large area about and including the subject, as desired. In passing, it may be mentioned that the diaphragm associated with the lens is merely to regulate the amount of light transmitted to the photo cell and thereby vary the exposure period accordingly. A mirror of the "beam splitting" type may be used at an angle in front of the lens, as indicated by $m'$, in connection with the optical system in Figure 1, so that a certain amount of direct skylight and/or artificial light could be used in conjunction with the reflected light from the subject to determine the exposure time. Its purpose would be, among other things, to give a "damping" effect, and smooth out possible variations in negative density due possibly to sudden large and erratic changes in subject.

I have provided a switch $O_3$, preferably of the push type, whereby it will return to normal closed position on being released, to test or check the VE portion of the mechanism. When the said switch $O_3$ is operated to open position, the VE circuits are cut out so that the machine will merely run off TL intervals. As heretofore noted, the start and exposure trip push button shown in Figure 1 gives a test or check on the entire machine, and since $O_3$ divides the circuit, the TL and VE features of the apparatus may be individually tested or checked.

Integration could, if desired, be brought about by means of a simple glow discharge circuit rather than by a triggering or grid control circuit. In this case, the primary VE timing condenser would have to supply power enough to trip a relay preferably of the meter-relay combination type. Even though the combination meter-relay or relay be extremely sensitive, the condenser required will have to be large to pass current enough to operate the combination instrument or relay, which means that the photo tube will probably not pass the required amount of current in the necessary time. The meter relay may be of the type that, with current through it in one direction, will act as a micro-ammeter, and if current is reversed, will close a set of contacts completing an external circuit. This combination might be advantageous in some respects; for instance, if by means of a selector switch, the meter or relay coil were to be connected in series with the photoelectric tube and power supply condenser, such as $C_1$, or otherwise, a direct indication or reading could be had of light value on the subject to be photographed, made with the same photo tube which is to be used for integration in the same position and under the same general conditions. If the triggering circuit as shown is used, the information conveyed by this reading could of course be obtained by actually timing an integration period, because time is an inverse function of intensity. An exposure meter might be used instead, although the differences in spectral sensitivity, and in the area of the subject would be likely to cause trouble. Such a meter relay combination might also serve another function; after exposure, its operating coil might be connected either in series with the TL timing resistors, or shunted across them, or possibly a portion thereof so that the shunted portion would vary in proportion to the actual amount of timing resistance used. In any case, the meter would now become a time-lapse indicator to indicate the progress of the time-lapse period, serving the same purpose as V of Figure 1, which would then be superfluous. The disadvantage of this meter relay combination would be that the light sensitivity of the VE would probably be very greatly decreased since, for one thing, a much larger VE condenser would now be required.

Under some conditions of operation, it may be desirable to use a curtain system, and I have therefore indicated, in Figure 5, a curtain and means for controlling it which I have found preferable over other schemes of curtain control with which I am familiar. In Figure 5, the curtain control relay $R_{11}$ is shown enclosed in a curtain control box Z which is equipped with a plug-in $P_1$ which corresponds to the plug-in $P_1$ of Figure 2. Extending from the contacts 1—2 and 4—5—6 of relay $R_{11}$, are conductors running to a suitable motor Q, connected so that when the relay $R_{11}$ is energized the direction of rotation of the motor Q is reversed. The motor Q is connected to a shaft $q$ carrying pulleys $a_1$ and $a_2$, over which wires $b$ and $b_1$ pass, these wires being connected at one end to weights $c$ and $c_1$, and at their opposite ends to a cross-rod $d$ carrying a curtain $e$ which may pass over a roller $f$.

The curtain $e$ may be held in stretched condition by a weighted bar $g$.

When the relay $R_{11}$ is energized through the contacts 2—6 of $R_4$, the contacts 1—5, 2—6 and 2—8 of relay $R_{11}$ are closed, thereby energizing the motor Q and raising the curtain $e$ from the position indicated. As the bar $d$ moves toward the shaft $q$, the lever $h$ is caused by the spring $i$ to close the contact $j$ which acts to open the motor circuit when the motor is reversed and the curtain is coming down again in the opposite direction. The bar $d$ in its travel toward the shaft $q$, finally engages the lever $k$, thereby closing the contacts $l$ and completing a circuit to a plug which is adapted to engage the jack $P_2$ (see Figure 2) when plugged therein.

The lever $k$ is connected mechanically through a link member $k_1$ to a lever $k_2$, opening a contact $n$ which opens the motor circuit when the curtain is drawn to its upper limit. The reverse operation will be clear without further description.

This curtain may be used to cover the subject or part thereof being photographed during exposure, or it may be used to uncover the subject or a part thereof during exposure. Also, this curtain system may be operated in two ways:

First: If the curtain control wires $P_1$ and $P_2$ are connected to $P_1$ and jack $P_2$ on the TL machine, then the warning delay is automatically cut out and exposure begins immediately after the curtain has reached its operated position.

Second: If $P_1$ alone is plugged into the TL machine, then the warning delay will be "in" except under certain conditions as heretofore stated, and therefore exposure will not start immediately after the curtain has reached its operated position, but will start at the end of the warning delay.

It will be apparent in the first case that curtains could be used with either 6 v. or 110 v. operation of the TL mechanism, or at TL periods greater or less than one minute; whereas in the second case, curtains could not ordinarily be used with TL operated on 6 v., or at TL periods under one minute, since, as heretofore described, the warning delay is cut out under these conditions.

It may be mentioned that the TL machine described herein is self-starting; for example, if the 110-volt power should fail, the momentary closing of contacts 1—2 of $R_1$ would have no effect except to momentarily activate the primary of $T_1$. In this case, no exposure would be made since the power is off, but since the capacity of $C_3$ is considerably greater than $C_4$, and since its initial starting potential is considerably above the ignition point of $N_6$, it would still retain a large part of its charge, so that after extinction of $N_6$, it would again begin to charge $C_4$ through the timing resistors.

The next timing interval would be somewhat longer than the last, as is readily apparent, and at the end of this interval, when the potential of $C_4$ reaches the breakdown value of $N_6$, $C_4$ would again discharge through $N_6$ and coil of $R_1$, and thereby cause contacts 1—2 of $R_1$ to again momentarily close. This would keep up for a number of cycles, probably not more than ten, or until the 110-volt power came "on".

The next closure of 1—2 of $R_1$ would complete the circuit through the primary of $T_1$ and cause the machine to resume normal operation, thus producing what I term a self-starting apparatus.

The machine would also be self-starting in this respect when operating on six volts.

If the machine has been intentionally shut down by turning S to "off" position, it will be self-starting in another respect; that is, when S, at a considerably later time, up to say a month, is to be again turned to six or 110 volts, the machine will again resume normal operation without further manipulation, since contacts 10—27—28 of S act to break the circuit between $C_3$ and $C_4$, leaving them with a charge which they are capable of retaining for long periods of time when S is turned off, and makes this circuit when S is turned to operating position.

It may be found expedient to use a ratchet relay, such as shown schematically in Figure 6, for certain reasons; for example, when longer time-lapse periods are required than the machine is equipped to handle, or if condensers $C_3$ and $C_4$ are not properly constructed, so that they will hold their charge, especially at abnormal temperatures.

In Figure 6, the relay $R_{12}$ has an armature 2 pivoted at 3, to which is pivotally attached a "dog" 1, the armature 2, shown in operated position, being returnable by a spring 4 when the coil of $R_{12}$ is de-energized. The dog 1 is adapted to engage a ratchet wheel 5 which is prevented from turning in reverse direction by a pawl 7. Mounted to turn integrally with the ratchet gear 5, is an insulated contact arm 6 which is adapted to close contacts 10, 11, 12 and 13 as the contact arm 6 is rotated. I have indicated four contacts symmetrically spaced with two blank spaces.

Associated with the ratchet gear mechanism is a switch 8 adapted to engage contacts 14, 15, 16, 17. The switch 8 is operated by a knob or control member 9, with which is associated a dial having indicated thereon the TL multiplying factors, such as 1 to 6, as indicated. When the knob 9 is set, for example, on multiplying factor 2, the switch 8 is on the contact 15. Under this condition, as the contact member 6 is rotated by the ratchet gear 5, only the contacts 10, 11 and 13 will be activated, so that when the circuit to $O_4$ is closed, through the contacts 2—6 of $R_4$, an exposure period is started. When the contact arm 6 is in any other position, then the $O_4$ circuit will be open, and although $R_4$ may be given an impulse, the circuit through the locking contacts 2—6 would be opened and the exposure cycle would not occur, although the TL period, as set by the switch M of Figure 1 would occur and thus be multiplied according to the setting of the TL multiplying factor control knob 9 of Figure 6, and, according to the assumption previously made, the TL period would be doubled.

While I have shown in Figure 6 a six-position ratchet wheel, the number may be made anything desired. Furthermore, the ratchet gear 5 might be geared to the contact member 6 through a separate shaft and gear mounting arrangement.

Another type of ratchet relay might use a return spring on the ratchet and only one pair of contacts, which would be adjustable in position about the ratchet. This ratchet, with contact finger, would return to initial starting position when these contacts are closed, in which case a special contact will be provided on the relay $R_4$ to lock it in position; or the contact fingers would return to initial starting position after the contacts are closed and exposure has been made. It will be apparent that a number of ratchet relays may be used together and operated in the same fashion as a counter, in order to increase the range and number of multiplying factors.

A ratchet relay, similar to that shown in Figure 6, may form a part of the TL machine, or it may be considered as a separate unit, in which case the TL machine and the unit would be equipped with plug-ins to complete the circuits $O_4$ and $R_{12}$. It is to be understood that although the mechanism is shown as a unit, it may be divided up into a number of units, for instance, the TL and ET functions might be separated and confined to separate units equipped with plug-ins to complete the necessary circuits and equipped to function separately and alone, if necessary. Since this would cause a duplication of parts and increase the complication, it has not been shown.

The two operation sequences which have been described have been given to show certain of the various functions of the machine, and from these it will be clear to one skilled in this art that there are many other combinations of conditions or sequence operations which will be performed by the apparatus or mechanism, and it is therefore to be understood that various changes may be made in the details for carrying out the principles of my invention, without departing from the spirit thereof or the scope of the appended claims, for instance, one such change may comprise the inclusion of a condenser and a resistor in series in the lead extending between the junction of the photo-electric cell P and $C_2$ and the movable contact on the resistor $w_4$. However, this additional resistance is not necessary provided $w_4$ is suitable. The purpose of such a condenser at the point indicated is to have the effective leakage of condensers $C_2$ vary with time regardless of integration, in other words, the effect being to straighten the exposure modulator curve so that the tendency to approach infinity will be lessened. Another change which might be made is the elimination of contact 6 on $R_3$ relay which would allow $C_4$ condenser to discharge down only to the extinction voltage of $N_6$. Under this condition the momentary actuation of the starting and exposure trip push button or the extension trip would make an exposure without disturbing any time lapse period that might be then in progress.

What I claim is:

1. A combination time lapse and photo-electric exposure control mechanism for taking pictures with a camera, including means for obtaining and controlling the time lapse period within any desirable range, means for setting instantly and at any time and controlling an exposure period within any desirable range, and photo-electric means for integrating light reflected from the subject toward the camera so that the exposure time is a function of the light intensity on the subject during the exposure period, and means for utilizing said integrated light to control the operation of at least the camera shutter to take at least one picture for each time lapse period.

2. A combination time lapse and photo-electric exposure control mechanism as set forth in claim 1 characterized in that automatic means are provided for starting the time lapse period and the exposure period at the same time even though the exposure period be longer than the time lapse period.

3. A combination time lapse and photo-electric exposure control mechanism as set forth in claim 1 characterized in that in addition to said setting and controlling means for the exposure period means are interlinked therewith for starting a single exposure period manually without interfering with the time-lapse period.

4. A combination time lapse and photo-electric exposure control mechanism as set forth in claim 1 characterized in that means are provided and interconnected with said time-lapse control means for indicating instantly how much time is necessary to complete a particular time lapse period and the starting of another one.

5. A time lapse and photo-electric exposure control mechanism as set forth in claim 1 characterized in that said setting and control means are adjustable so as to convert at will the entire mechanism into one which will have constant or variable exposure periods as desired.

6. A combination time lapse and photo-electric exposure control mechanism as set forth in claim 1 characterized in that means are provided in the mechanism for controlling the operation of a curtain mechanism for shielding the subject from undesirable illumination during the exposure periods.

7. A combination time lapse and photo-electric exposure control mechanism as set forth in claim 1 characterized in that means comprising a modulator as herein defined are provided in the mechanism for taking pictures by any light available so each picture may have substantially the same average density.

8. A combination time lapse and photo-electric exposure control mechanism as set forth in claim 1 characterized in that means comprising a modulator as herein defined are provided in the mechanism for taking pictures by any light available, the modulator being adjusted so that a long sequence of pictures or frames may have a successive and gradual change in density.

9. In an apparatus of the class described mechanism for obtaining time lapse and photo exposure periods, said mechanism including a timing condenser for initiating a period or cycle of operations, an electronic relay in series with said condenser and responsive to the discharge of current therefrom, a voltage supply condenser for charging said timing condenser, means for charging said voltage supply condenser from a suitable source of current and further means for utilizing the impulses from said electronic relay to produce the time lapse periods.

10. An apparatus as set forth in claim 9 further characterized in that means are provided for discharging the timing condenser at least to a value of the extinction voltage of the electronic relay before it receives its next charge from said voltage supply condenser.

11. An apparatus as set forth in claim 9 further characterized in that means are provided for removing said voltage supply condenser from the supply circuit while it is charging the timing condenser.

12. An apparatus as set forth in claim 9 further characterized in that an adjustable resistance is connected in the charging circuit between the voltage supply condenser and the timing condenser.

13. An apparatus as set forth in claim 9 further characterized in that an electro-magnetic relay is used to open the supply circuit to said voltage supply condenser when deenergized and the same relay is also used when actuated to short circuit the timing condenser.

14. An apparatus as set forth in claim 9 further characterized in that an electro-magnetic relay is in circuit with said electronic relay for causing the actuation of a second electro-magnetic relay that in turn passes the current supply to said voltage supply condenser.

15. An apparatus as set forth in claim 9 further characterized in that an electro-magnetic relay is in circuit with said electronic relay for causing the actuation of a second electro-magnetic relay that in turn passes the current supply to said voltage supply condenser, and a third electro-magnetic relay operated by the second relay for further controlling the current supply circuit to said voltage supply condenser and for short circuiting the timing condenser when actuated.

16. An apparatus as set forth in claim 9 further characterized in that an electro-magnetic relay is in circuit with said electronic relay for causing the actuation of a second electro-magnetic relay that in turn passes the current supply to said voltage supply condenser, and a third electro-magnetic relay operated by the second relay for further controlling the current supply circuit to said voltage supply condenser and for short circuiting the timing condenser when actuated, and a fourth electro-magnetic relay controlling a circuit through the second electro-magnetic relay and actuated by said third electro-magnetic relay for deenergizing said second electro-magnetic relay but maintaining the source of current supply for other devices of the mechanism during an exposure period, said fourth electro-magnetic relay also serving to activate other devices for starting the exposure period and the integration of light from the subject being photographed.

17. An apparatus as set forth in claim 9 further characterized in that means are provided for giving a warning signal when the time lapse period is to be above a predetermined minimum time.

18. An apparatus as set forth in claim 9 further characterized in that means are provided for giving a warning signal when the time lapse period is to be above a predetermined minimum time, and further means including a thermal relay for delaying the exposure period for the purpose described.

19. An apparatus as set forth in claim 9 further characterized in that means are provided for giving a warning signal when the time lapse period is set above a predetermined minimum time, and further means including a thermal relay for delaying the exposure period for the purpose described, and means for cutting out both the warning signal and the thermal delay relay when the time lapse period is set below a predetermined minimum.

20. In an apparatus of the class described mechanism including a further relay for obtaining time lapse periods as set forth in claim 9 further characterized in that an exposure period is started by said further relay actuated early in the time lapse period, said further relay causing the opening of a camera shutter, and further means for integrating at least part of the light coming from the subject being photographed.

21. In an apparatus of the class described mechanism for obtaining time lapse periods as set forth in claim 9 further characterized in that an exposure period is started by a relay actuated early in the time lapse period, said relay causing the opening of the camera shutter, and further means for integrating at least part of the light coming from the subject being photographed, said integrating means including a photo-electric cell, a condenser connected to the cell for passing current through the cell and a plurality of electronic relays connected so as to produce a trigger action in connection with said last mentioned condenser and another condenser for supplying current to said trigger relays and a further electronic relay for controlling the action of said condenser.

22. In an apparatus of the class described mechanism for obtaining time lapse periods as set forth in claim 9 further characterized in that an exposure period is started by a relay actuated early in the time lapse period, said relay causing the opening of the camera shutter, and further means for integrating at least part of the light coming from the subject being photographed, said integrating means including a photo-electric cell, a condenser connected to the cell for passing current through the cell and a plurality of electronic relays connected so as to produce a trigger action in connection with said last mentioned condenser and another condenser for supplying current to said trigger relays and a further electronic relay for controlling the action of said condenser, and means for modulating the action of the cell.

23. In an apparatus of the class described mechanism for obtaining time lapse periods as set forth in claim 9 further characterized in that an exposure period is started by a relay actuated early in the time lapse period, said relay causing the opening of the camera shutter, and further means for integrating at least part of the light coming from the subject being photographed, said integrating means including a photo-electric cell, a condenser connected to the cell for passing current through the cell and a plurality of electronic relays connected so as to produce a trigger action in connection with said last mentioned condenser and another condenser for supplying current to said trigger relays and a further electronic relay for controlling the action of said condenser, and a high resistance connected across said triggering relays and to the cell for modulating the effect thereof.

24. In an apparatus of the class described mechanism for obtaining time lapse periods as set forth in claim 9 further characterized in that an exposure period is started by a relay actuated early in the time lapse period, said relay causing the opening of the camera shutter, and further means for integrating at least part of the light coming from the subject being photographed, said integrating means including a photo-electric cell, a condenser connected to the cell for passing current through the cell and electronic relay means connected so as to produce a trigger action in connection with said last mentioned condenser and another condenser for supplying current to said trigger relay means and a further electronic relay means for controlling the action of said condenser, and means for insuring that said last two mentioned condensers are charged up to the extinguishing voltage of the electronic relay means connected thereto before integration begins.

25. In an apparatus of the class described mechanism for obtaining time lapse periods as set forth in claim 9 further characterized in that an exposure period is started by a relay actuated early in the time lapse period, said relay causing the opening of the camera shutter, and a further means for controlling and automatically switching on lights on subject when required.

26. In an apparatus of the class described mechanism for obtaining time lapse periods as set forth in claim 9 further characterized in that an exposure period is started by a relay actuated early in the time lapse period, said relay causing the opening of the camera shutter, and a further relay means for switching on lights when required, and a thermal relay to delay the going on of the lights until after the camera shutter has been opened.

27. In an apparatus of the class described mechanism for obtaining time lapse periods as set forth in claim 9 further characterized in that an exposure period is started by a relay actuated early in the time lapse period, said relay causing the opening of the camera shutter, and further means for integrating at least part of the light coming from the subject being photographed, said integrating means including a photo-electric cell, a condenser connected to the cell for passing current through the cell and electronic relay means connected so as to produce a trigger action on said last mentioned condenser and another condenser for supplying current to said trigger relay means and a further electronic relay means for controlling the action of said condenser, and a high resistance connected across said triggering relay means and to the cell for modulating the effect thereof, and a relay connected directly to one side of the trigger circuit for deenergizing the relays controlling the camera and lights.

28. In an apparatus of the class described mechanism for obtaining time lapse periods as set forth in claim 9 further characterized in that an exposure period is started by a relay actuated early in the time lapse period, said relay causing the opening of the camera shutter, and further means for integrating at least part of the light coming from the subject being photographed, said integrating means including a photo-electric cell, a condenser connected to the cell for passing current through the cell and electronic relay means connected so as to produce a trigger action on said last mentioned condenser and another condenser for supplying current to said trigger relay means and a further electronic relay means for controlling the action of said condenser, and an exposure modulator associated with the cell with means for using the same at different times for maximum exposure time control and constant exposure control.

29. In an apparatus of the class described mechanism for obtaining time lapse periods as set forth in claim 9 further characterized in that an exposure period is started by a relay actuated early in the time lapse period, said relay causing the opening of the camera shutter, and further means for integrating at least part of the light coming from the subject being photographed, said integrating means including a photo-electric cell, a condenser connected to the cell for passing current through the cell and electronic relay means connected so as to produce a trigger action on said last mentioned condenser and another condenser for supplying current to said trigger relay means and a further electronic relay means for controlling the action of said condenser, and means for attaining maximum exposure time independent of the integrating means.

30. In combination with a mechanism as set forth in claim 1 an optical system, associated with said photo-electric means, including a lens with means for directing thereto the light from the subject and a filter having properties so associated with the cell characteristics that the spectral sensitivity curve of the cell and filter approximately matches that of the film on which the pictures are being taken.

31. In combination with a mechanism as set forth in claim 1 an optical system, associated with said photo-electric means, including a lens with means for directing thereto the light from the subject and a filter, the photo-electrically controlled means including a photo-cell of the caesium oxide type while the filter acts to suppress the ultra-violet and infra-red portions whereby the spectral sensitivity curve of the cell and filter approximately matches that of the film on which the pictures are being taken.

32. In combination with a mechanism as set forth in claim 1 an optical system, associated with said photo-electric means which incorporates a photo-cell, including a lens with means for directing thereto the light from the subject and a filter having properties so associated with the cell characteristics that the spectral sensitivity curve of the cell and filter approximately matches that of the film on which the pictures are being taken, shutter means for shielding the photo-cell from strong light and means for exposing the cell only during exposure periods.

33. In combination with a mechanism as set forth in claim 1 an optical system, associated with said photo-electric means which incorporates a photo-cell, including a lens with means for directing thereto the light from the subject and a filter having properties so associated with the cell characteristics that the spectral sensitivity curve of the cell and filter approximately matches that of the film on which the pictures are being taken, and means located between the lens and the photo-cell for compensating for areas of unequal sensitivity on the cathode of the cell.

34. In combination with a mechanism as set forth in claim 1 an optical system, associated with said photo-electric means which incorporates a photo-cell, including a lens with means for directing thereto the light from the subject and a filter having properties so associated with the cell characteristics that the spectral sensitivity curve of the cell and filter approximately matches that of the film on which the pictures are being taken, means located between the lens and the photo-cell for compensating for areas of unequal sensitivity on the surface of the cell, and a mask located near said compensating means whereby the combination mechanism may be used alongside the camera if desired and the light to be integrated may be limited or extended to include that reflected from any portion of the subject.

35. In combination with a mechanism as set forth in claim 1 an optical system, associated with said photo-electric means which incorporates a photo-cell, including a lens with means for directing thereto the light from the subject and a filter having properties so associated with the cell characteristics that whereby the spectral sensitivity curve of the cell and filter approximately matches that of the film on which the pictures are being taken, means located between the filter and the photo-cell for compensating for areas of unequal sensitivity on the surface of the cell, a mask located near said compensating means and on the side thereof nearest the photo-cell whereby the combination mechanism may be used alongside the camera if desired, and a viewing mirror preferably of the beam splitting type located at an angle in front of the cell.

36. In combination with a mechanism as set forth in claim 1 an optical system, associated with said photo-electric means which incorporates a photo-cell, including a lens with means for directing thereto the light from the subject, a diaphragm in front of the lens to change the exposure time; a filter, a ground glass, a mask and a removable viewing mirror all located between the lens and the photo-cell.

37. A combination time lapse and photo-electric exposure control mechanism for taking pictures with a camera, including means for obtaining and controlling time lapse periods within any desirable range, means for setting and controlling an exposure period within any desirable range, a self-restoring switch for cutting out the variable exposure portion of the mechanism whereby the time lapse portion of the mechanism may be checked and tested.

38. In a combination time lapse and photo-electric exposure control mechanism for taking pictures with a camera, means for obtaining and controlling time lapse periods within any desirable range, means for setting and controlling the exposure period within any desirable range, a self-restoring switch for cutting out the variable exposure portion of the mechanism whereby the time lapse portion of the mechanism may be checked and tested, and a further switch for testing the entire mechanism, said last mentioned switch serving to prime the voltage supply and timing condensers after a long period of disuse, said switch also serving to produce a single exposure or a series of exposures, without disturbing any time lapse period that may be in progress.

39. A combination time lapse and photo-electric exposure control mechanism for taking pictures with a camera, including means for obtaining and controlling time lapse period within any desirable range, means for setting and controlling an exposure period within any desirable range, a main switch for controlling the application of a plurality of power supplies to the mechanism, condensers for rendering the mechanism self-starting even after long periods of disuse, in circuits controlling said time-lapse periods, said circuits being also controlled by said switch.

40. An apparatus as set forth in claim 9 further characterized in that the voltage supply condenser has a much greater capacity than said timing condenser whereby several cycles of time lapse periods may take place even if the source of current be "off".

41. In an apparatus of the class described mechanism for obtaining time lapse periods as set forth in claim 9 further characterized in that an exposure period is started by a relay actuated early in the time lapse period, said relay causing the opening of the camera shutter, and further means for integrating at least part of the light coming from the subject being photographed, and means including a relay for directly ending the integration and exposure period should the light on the subject be disabled or cut off.

42. A combination time lapse and photo-electric exposure control mechanism as set forth in claim 1 characterized in that means are provided in the mechanism for governing the operation of a curtain mechanism for controlling the light on the subject, and further characterized in that the time lapse and exposure control apparatus is equipped with plug ins for the curtain control wires which when connected thereto automatically cuts out a warning delay and allows exposure to begin immediately after the curtain has reached its operated position.

43. In a time lapse and photo-electric exposure machine as described, means for increasing the time lapse periods beyond what the machine is equipped to handle, said means comprising a ratchet relay connected into circuit with the proper relay in the regular time lapse mechanism so the time lapse period is multiplied according to the construction and control of said ratchet relay.

44. An apparatus as set forth in claim 1 characterized in that the integrating mechanism including the voltage supply and timing condenser and electronic relay actuated thereby, are placed in a sealed dehydrated chamber.

45. An apparatus as set forth in claim 1 characterized in that means are provided for obtaining the time lapse and exposure periods in step-by-step or simultaneous relationship.

46. An apparatus as set forth in claim 1 characterized in that means are provided for cutting out the camera manually and further means for cutting out the camera automatically when exposure is longer than the maximum exposure time setting and automatically cuts the camera in again when the exposure gets shorter.

47. In combination with a mechanism as set forth in claim 1 an optical system, associated with said photo-electrically controlled means comprising a photo-cell, including a lens with means for directing thereto the light from the subject and a filter having properties so associated with the cell characteristics that whereby the spectral sensitivity curve of the cell approximately matches that of the film on which the pictures are being taken, means located between the filter and the photo-cell for compensating for areas of unequal sensitivity on the cathode of the cell, a mask located near said compensating means and on the side thereof nearest the photo-cell whereby the combination mechanism may be used alongside the camera if desired, and a mirror preferably of the beam splitting type located at an angle between the subject and the lens, whereby a certain amount of direct skylight or artificial light may be used in conjunction with the reflected light from the subject to determine the exposure time.

48. In an apparatus of the class described mechanism for obtaining time lapse periods as set forth in claim 9 further characterized in that an exposure period is started by a relay actuated early in the time lapse period, said relay causing the opening of the camera shutter, and further means for integrating at least part of the light coming from the subject being photographed, said integrating means including an exposure timing condenser $C_2$, at least one current controlling device for passing current from said condenser, an integrating voltage supply condenser $C_1$ with means for charging the same, electronic relay means for regulating the starting voltage connected across $C_1$, and electronic trigger relay means with means for connecting both said relay means into circuit integrating position and across said voltage timing condenser and said current controlling device.

CLINTON P. VEBER.